US00RE35510E

United States Patent [19]

McMurtry

[11] E Patent Number: Re. 35,510

[45] Reissued Date of Patent: May 20, 1997

[54] PROBE HEAD WITH INDEXING MECHANISM

[75] Inventor: David R. McMurtry, Wotton-under-Edge, United Kingdom

[73] Assignee: Renishaw Metrology Limited, Gloucestershire, United Kingdom

[21] Appl. No.: 389,785

[22] Filed: Feb. 16, 1995

Related U.S. Patent Documents

Reissue of:

[64] Patent No.: 5,185,936
Issued: Feb. 16, 1993
Appl. No.: 911,120
Filed: Jul. 9, 1992

[30] Foreign Application Priority Data

Jul. 11, 1991 [GB] United Kingdom ..... 9114946

[51] Int. Cl.[6] ..... G01B 5/012; B23Q 17/22

[52] U.S. Cl. ..... 33/572; 33/556; 33/503; 33/1 D; 74/826

[58] Field of Search ..... 33/503, 504, 556, 33/1 D, 1 PT, 572; 74/817, 818, 826

[56] References Cited

U.S. PATENT DOCUMENTS

| | | | |
|---|---|---|---|
| 3,091,133 | 5/1963 | Hoeger | 74/826 |
| 4,168,576 | 9/1979 | McMurtry . | |
| 4,349,906 | 9/1982 | Scifres et al. . | |
| 4,644,825 | 2/1987 | Yamazaki | 74/826 X |
| 4,888,877 | 12/1989 | Enderle et al. | 33/503 X |
| 4,938,083 | 7/1990 | Gurny et al. . | |
| 5,028,901 | 7/1991 | Enderle et al. . | |
| 5,041,806 | 8/1991 | Enderle et al. . | |
| 5,228,205 | 7/1993 | Bertz et al. | 33/556 |

FOREIGN PATENT DOCUMENTS

| | | | |
|---|---|---|---|
| 142373 | 5/1985 | European Pat. Off. . | |
| 317967 | 5/1989 | European Pat. Off. . | |
| 0392660 | 10/1990 | European Pat. Off. | 33/559 |
| 0406781 | 1/1991 | European Pat. Off. . | |
| 0406782 | 1/1991 | European Pat. Off. . | |
| 0471168A2 | 6/1991 | European Pat. Off. . | |
| 3011002 | 10/1980 | Germany . | |
| 3811851 | 10/1989 | Germany . | |
| 1044355 | 9/1966 | United Kingdom | 74/826 |
| 2047133 | 11/1980 | United Kingdom . | |
| WO89/05210 | 6/1989 | WIPO . | |

OTHER PUBLICATIONS

Carl Zeiss Produktinformation, "DSE 05 Dreh–Schwenk–Einrichtung".

Renishaw Product Brochure & Description; "PH9 Automated Inspection System for Measuring Machines" No Date.

*Primary Examiner*—Thomas B. Will
*Attorney, Agent, or Firm*—Oliff & Berridge

[57] ABSTRACT

A probe head (10) includes a support (12) by which the probe head is retained on the quill of a coordinate positioning machine, and a rotor (14) which is magnetically retained on the support (12). The rotor (14) is rotatable between a plurality of indexed angular positions provided by a ring or balls (26) and three adjacently positioned pairs of rollers (24). A drive dog shaft (20) is linearly movable to disengage the balls (26) from the rollers (24), and rotatable to rotate the rotor (14) to a new indexed position, whereupon the drive dog shaft (20) is retracted to re-engage a set of three balls (26) with the rollers (24). Exchange of a measuring probe (16) is performed by removing the entire rotor (14), and exchanging it for a further rotor carrying a different measuring probe. The engagement elements provided by rollers (24) and balls (26) thus serve the functions of (a) indexing and (b) repeatably [retaining] *positioning* a rotor (14) on the support (12). This reduces the number of kinematic locations required between the movable arm of the machine and the probe (16) during the course of normal operation of a probe head to which a number of probes (16) are releasably couplable.

21 Claims, 2 Drawing Sheets

PROBE HEAD WITH INDEXING MECHANISM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a probe head used on a coordinate positioning machine to orient a touch trigger probe (for example) relative to the movable arm (or quill) of the machine. The coordinate positioning machine may e.g. be either a coordinate measuring machine or a machine tool.

2. Description of Related Art

It is known (from "Probing for Productivity on Coordinate Measuring Machines" RENISHAW) to provide a two-axis motorised probe head for orienting a probe relative to the quill of a machine with two degrees of rotational freedom. Such a probe head comprises a support, which is connectable to the quill of a machine, and a pair of serially mounted rotors, each of which is engageable in, and may rotate between a plurality of indexed positions. A probe is connected to the "free" rotor, and is oriented relative to the quill by rotation of one or both of the rotors about their respective axes. Indexing of position between two relatively rotating parts is provided by a ring of balls on one of the parts, and three seating members on the other part, each of which seats in the convergent surfaces provided by an adjacent pair of balls. Thus, at each of the indexed positions each rotor is kinematically supported; this provides maximum positional repeatability of the probe at each indexed position.

It is often desirable, in order to perform different types of measuring operation, to exchange one probe which is carried by the probe head for another. EP 0142373 discloses a system which provides releasable kinematic engagement of a probe in order to facilitate probe change.

This obviates the need to calibrate the machine each time a given probe is removed and replaced on the machine, in order to determine the position of the probe relative to the quill.

However, in spite of the high positional repeatability of each of the individual kinematic locations formed between the probe and the quill for the purpose of supporting the probe, (i.e. the kinematic location of the probe on the probe head, and the kinematic location of each of the rotors in the probe head), the repeatability of the position of the probe relative to the quill in a given orientation of the probe head over a number of probe-change and/or probe head orienting cycles decreases with the number of kinematic locations formed between the probe and the quill which are coupled and uncoupled in the course of normal operation.

SUMMARY OF THE INVENTION

According to a first aspect of the present invention a system is provided for interchanging a number of probes upon an indexing probe head of the type described above, in which each of the probes to be supported on the probe head is mounted to a carrying member which, in use, forms the rotor of the probe head.

Accordingly, the present invention provides a probe head for orienting a probe relative to the movable arm of a coordinate positioning machine, comprising:

a support by which the probe head is connectable to the arm of the machine;

a rotor for carrying a probe;

retaining means for releasably retaining the rotor on the support, to enable one rotor to be exchanged for another;

indexing means for providing a plurality of indexed angular positions of the rotor relative to the support, comprising a first set of engagement elements provided on one of the rotor and support, and a plurality of sets of second engagement elements provided on the other of the rotor and support, said first set of engagement elements being engageable with each set of said plurality of sets of second engagement elements to provide, at each indexed position, a stable, repeatable rest position of the rotor on the support;

coupling and decoupling means for engaging and disengaging said first set of engagement elements with a set of said second engagement elements; and driving means for rotating said rotor relative to said support substantially about an axis when said first and second engagement elements are disengaged, thereby to rotate said rotor from one indexed position to another.

This aspect of the present invention reduces the number of parts which are coupled and uncoupled during normal operation by utilising the first and second engagement elements for both indexing and probe change functions.

In use, each probe required by the machine is connected to a separate rotor, all of which are retained on the machine. When a particular inspection cycle requires a change of probe, this is achieved by exchanging rotors.

Preferably, the rotor will be magnetically retained on the support. Preferably, an axially movable drive dog is engageable with the rotor to uncouple the first and second engagement elements and thus enable rotation of the rotor between indexed locations.

BRIEF DESCRIPTION OF DRAWINGS

An embodiment of the invention will now be described, by way of example, and with reference to the accompanying drawings in which.

DESCRIPTION OF PREFERRED EMBODIMENTS

Figure 1:
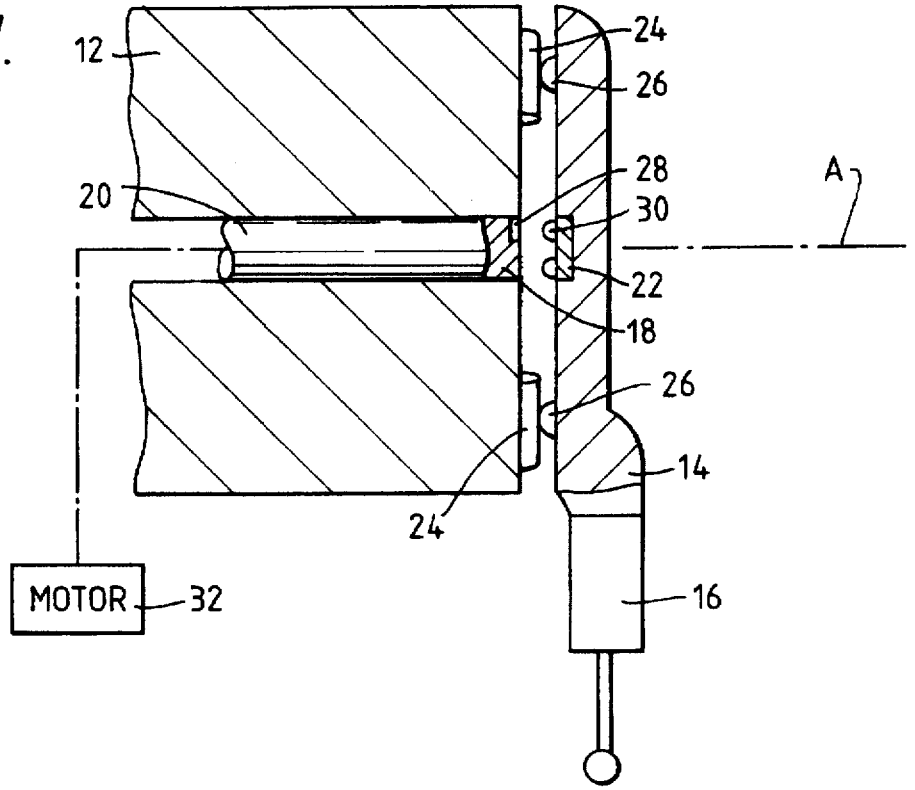
FIG. 1 is a section through a probe head according to the present invention.
Figure 2:
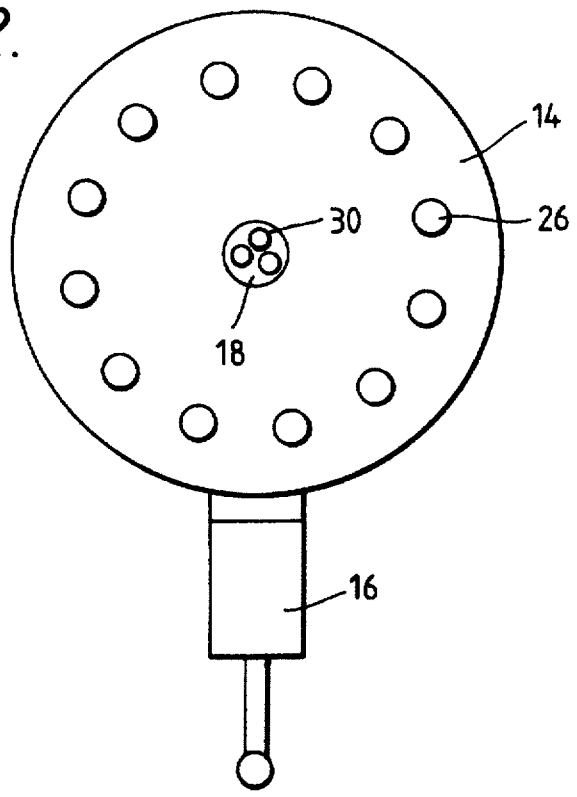
FIG. 2 is a section on II—II in FIG. 1.
Figure 3:
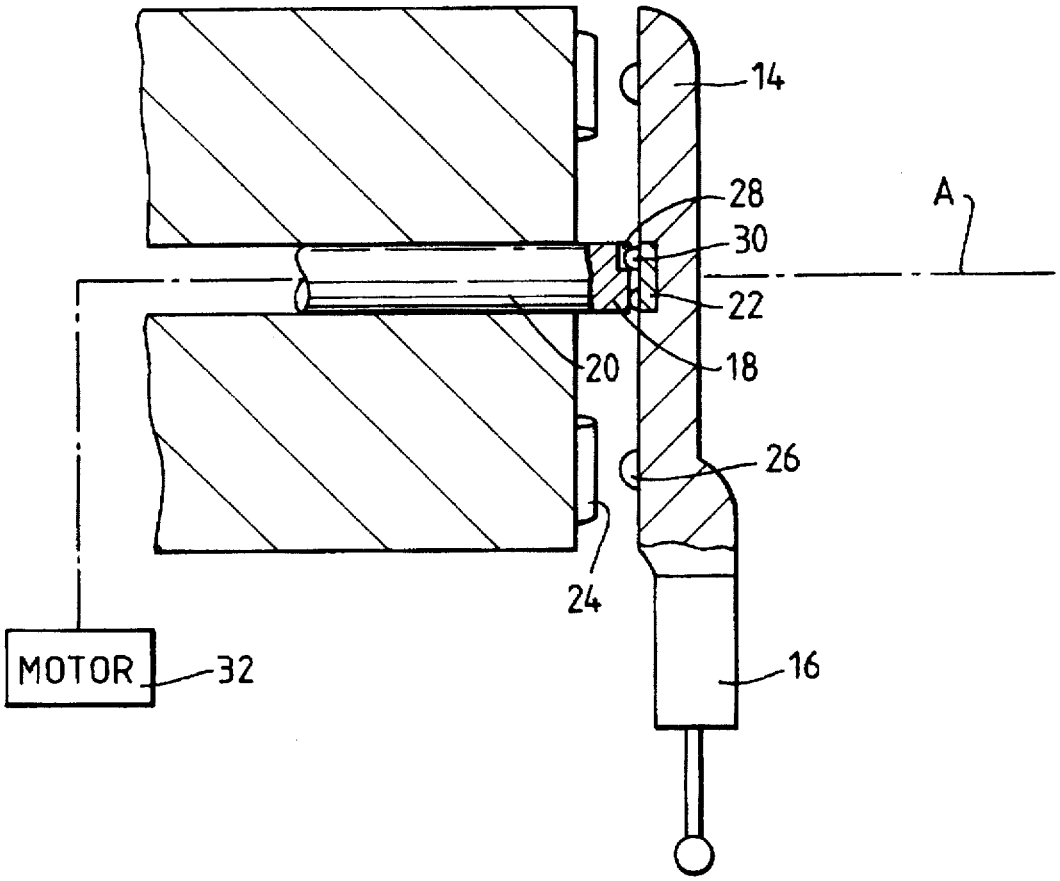
FIG. 3 is a further section through the probe head of the present invention.

Referring now to FIGS. 1–3, a probe head 10 comprises a support 12 by which the probe head 10 may be carried on the movable arm, [of] *or* quill of a coordinate positioning machine (such as a coordinate measuring machine or machine tool). A rotor 14, whose purpose is to carry a probe 16, is releasably retained on the support 12 by retaining means in the form of a permanent magnet 18 provided on a drive dog shaft 20 which cooperates with a ferromagnetic element in the form of a further magnet 22 provided on the rotor 14. A first set of engagement elements in the form of three adjacently positioned, equispaced pairs of rollers 24 is provided on the support 12. A plurality of sets of second engagement elements in the form of a ring of balls 26 is provided on the rotor 14; when the rotor 14 is retained on the support 12 by the *biasing* action of magnets 18,22, three of the balls 26 seat in the convergent surfaces defined by adjacently positioned pairs of rollers 24. The pairs of rollers 24 are included in a series of electrical circuit (not shown) which is completed when each of a set of three balls 26 seat in the convergent surfaces of adjacently positioned pairs of rollers, thus indicating that the rotor 14 is correctly retained on the support 12.

The rotor 14 may be oriented in any one of a plurality of indexed angular positions relative to the support 12 by disengaging each of a set of three balls 26 from the rollers 24, rotating the rotor 14 relative to the support 12, and engaging a further set of three balls 26 with the rollers 24. It is noted that the number of sets of three balls 26 thus determines the number of indexed angular positions which the rotor 14 may adopt relative to the support 12.

Disengagement of balls 26 and rollers 24, as shown in FIG. 3, is achieved by axial movement of the drive dog shaft 20 to engage each of three vee-groove detent elements 28 provided on the magnet 18 with three further balls 30 provided on the rotor 14, and subsequently axially displacing the rotor 14 until the balls 26 are moved clear of the convergent surfaces of adjacently positioned pairs of rollers 24. The magnetic attraction between the magnets 18 and 22 ensures that the rotor 14 does not fall off during this operation. Axial movement of the drive dog shaft 20 is actuated by a motor 32, which also rotates the drive dog shaft 20, thereby to orient the rotor 14 in a different indexed angular position. Once oriented, the motor 32 is controlled to retract the drive dog shaft 20 and bring a further set of three balls 26 into engagement with the rollers 24. The motor 32 continues to withdraw the drive dog shaft 20 until the magnets 18,22 lose contact with each other. However, the magnetic force between the magnets 18,22 is sufficient to ensure the rotor 14 is *biased toward and* retained securely upon the support 12 in the new indexed position. The probe 16 may thus be positioned at a plurality of angular indexed locations, at each of which the rotor 14 is kinematically supported on the support 12. The rotor 14 is thus in a stable and repeatable position relative to the support at each of the aforementioned angular positions.

At each of the indexed angular positions, the centre point O of the rotor 14 will lie at a fractionally different position relative to the axis A of the drive dog shaft 20. This is a result of the tolerances associated with positioning the ring of balls 26 and the rollers 24. The rotor 14 may thus be described as having a "wandering axis" relative to the support 12; nonetheless for practical purposes the rotor 14 is rotatable about the axis A.

When it is desired to exchange the probe 26 for a different type of probe, the entire rotor 14 is removed from the support 12, and a new rotor is mounted thereon. The dual function of the balls 26 and rollers 24 as both indexing elements and [retaining] *position retention* elements thus serves to eliminate the existing releasable connection between a probe head and a probe. In a modification to the present invention, the magnet 18 may be provided at a plurality of positions around the drive dog shaft 20 on the fixed part of the support 12; this eliminates the need to provide a magnet 18 at the end of the drive dog shaft 20.

I claim:

1. A probe head for orienting a probe relative to [the] *a* movable arm of a coordinate positioning machine, comprising:

a support by which the probe head is connectable to the arm of the machine;

a rotor for carrying a probe;

retaining means for releasably retaining the rotor on the support, to enable one rotor to be exchanged for another;

indexing means for providing a plurality of *angularly* indexed [angular] positions of [the] *said* rotor relative to [the] *said* support, comprising a first set of engagement elements provided on one of [the] *said* rotor and support, and a plurality of sets of second engagement elements provided on the other of [the] *said rotor* and *said* support, said first set of engagement elements being engageable with each set of said plurality of sets of second engagement elements to provide, at each *angularly* indexed position *of the plurality of angularly indexed positions*, a stable[,] *and* repeatable [rest] position of [the] *said* rotor on [the] *said* support;

coupling and decoupling means *provided on said rotor and said support* for engaging and disengaging said first set of engagement elements with a set of said second engagement elements; and driving means *provided on said support* for rotating said rotor relative to said support substantially about an axis when said first and second engagement elements are disengaged, thereby to rotate said rotor from one *angularly* indexed position to another.

2. A probe head according to claim 1, wherein said retaining means comprises a magnet provided on one of [the] *said* rotor and *said* support, and a ferromagnetic element provided on the other of [the] *said* rotor and *said* support to axially urge said first and [a] *one of said plurality of sets of* said second [set of]engagement elements into engagement.

3. A probe head according to claim 2, wherein said driving means are provided by [an axially movable and] *a* rotatable drive dog on [the] *said* support, said drive dog having a set of detent elements configured to engage a corresponding set of detent elements provided on said rotor.

4. A probe head according to claim 3, wherein said *drive dog is axially moveable and said* coupling and decoupling means are provided by [said axially movable and rotatable] *axial movement of said* drive dog.

5. A probe head according to claim 3, wherein said magnet and ferromagnetic element are each provided on one of [the]*said* drive dog and *said* rotor.

*6. A probe head for orienting a probe relative to a moveable arm of a coordinate positioning machine, comprising:*

*a support structure by which the probe head is connectable to the moveable arm of the machine;*

*a rotor rotatable relative to the support about an axis for carrying a probe;*

*an indexing device comprising first and second sets of mutually engageable indexing elements on the rotor and support structure respectively, engageable in a plurality of angular orientations about said axis, to provide a corresponding plurality of angularly indexed positions at which the rotor has a stable and repeatable position on the support;*

*a coupling and decoupling device for engaging and disengaging the first and second sets of indexing elements;*

*a driving device for rotating the rotor relative to the support structure when the first and second sets of indexing elements are disengaged, thereby to rotate the rotor from one angularly indexed position of the plurality of angularly indexed positions to another, the driving device including first and second sets of mutually engageable engagement elements provided on the rotor and support structure, and wherein means are provided for disengaging the engagement elements during coupling of the first and second sets of indexing elements.*

7. A probe head according to claim 6, wherein the coupling and decoupling device includes a magnetic element connected to one of the rotor and the support structure and a ferromagnetic element connected to the other of the rotor and the support structure.

8. A probe head according to claim 7, wherein the coupling and decoupling device further comprises a motor and an axially movable drive dog, actuable by the motor and connected to the support structure for engaging the rotor, thereby to increase and decrease the separation between the magnetic and ferromagnetic elements.

9. A probe head according to claim 8, wherein said engagement elements are provided on the drive dog and the rotor.

10. A probe head according to claim 8, wherein the magnetic element is provided on one of the drive dog and the rotor and the ferromagnetic element is provided on the other of the drive dog and the rotor.

11. A probe head for orienting a probe relative to a movable arm of a coordinate positioning machine, comprising:

a support by which the probe head is connectable to the arm of the machine;

a rotor, rotatable relative to the support about an axis, for carrying a probe;

an indexing device comprising first and second sets of mutually engageable indexing elements provided on the rotor and the support respectively, engageable in a plurality of angular orientations about the axis to provide a corresponding plurality of angularly indexed positions at which the rotor has a stable and repeatable position on the support;

coupling and decoupling device for engaging and disengaging the first and second sets of indexing elements;

a driving device for rotating the rotor relative to the support when the first and second sets of indexing elements are disengaged, thereby to rotate the rotor from one indexed position to another; and a retaining device for releasably retaining the rotor on the support to enable one rotor to be exchanged for another.

12. A probe head according to claim 11, wherein said retaining device comprises a magnet provided on one of the rotor and the support and a ferromagnetic element provided on the other of the rotor and the support to axially urge the first and second sets of indexing elements into engagement.

13. A probe head according to claim 12, wherein the coupling and decoupling device comprises an axially movable drive dog on the support.

14. A probe head according to claim 12, wherein the axially movable drive dog is rotatable and comprises sets of mutually engageable driving elements provided on the drive dog and rotor thereby to provide the driving device.

15. A probe head according to claim 14, wherein means are provided for disengaging the sets of driving elements on the drive dog and the rotor during coupling of the first and second sets of indexing engagement elements.

16. A probe head according to claim 13, wherein the magnet and ferromagnetic element are each provided on one of the drive dog and rotor.

17. A probe head for orienting a probe relative to a moveable arm of a coordinate positioning machine, comprising:

a support by means of which the probe head is connectable to the moveable arm of the machine;

a rotor for carrying a probe, the rotor is rotatable relative to the support about an axis;

an indexing device comprising first and second sets of mutually engageable indexing elements on the rotor and the support respectively, engageable at a plurality of angular orientations about the axis to provide a corresponding plurality of angularly indexed positions at which the rotor has a stable and repeatable position on the support;

a coupling and decoupling device for engaging and disengaging the first and second sets of indexing elements comprising a magnetic element provided on one of the rotor and the support and a ferromagnetic element on the other of the rotor and the support, for axially urging the first and second sets of indexing elements into engagement, and an axially moveable member provided on the support for axially displacing the rotor relative to the support thereby to effect the disengagement; and a driving device for rotating the rotor relative to the support substantially about the axis when the first and second sets of indexing elements are disengaged, thereby to rotate the rotor from one indexed position to another.

18. A probe head according to claim 17, wherein the one of the magnetic element and the ferromagnetic element on the support is provided on the axially movable member.

19. A probe head according to claim 18, wherein the axially moveable member is a rotatable drive dog, and first and second sets of mutually engageable driving elements are provided upon the drive dog and the rotor respectively, the driving device being provided by the drive dog, the driving elements, and a motor for rotating the drive dog.

20. A probe head for orienting a probe relative to a moveable arm of a coordinate positioning machine, comprising:

a support by means of which the probe head is connectable to the moveable arm of the machine;

a rotor for carrying a probe, the rotor rotatable relative to the support about an axis;

an indexing device comprising first and second sets of mutually engageable indexing elements on the rotor and the support respectively, engageable at a plurality of angular orientations about said axis to provide a corresponding plurality of angularly indexed positions at which the rotor has a stable and repeatable position on the support;

a biasing device for axially biasing the rotor into engagement with the support;

an axially moveable drive dog on the support which is engageable with the rotor, and a motor for actuating the drive dog, the drive dog being actuable by the motor to increase and decrease the axial separation of the rotor and support and, thereby, in cooperation with the biasing device, correspondingly disengage and engage the indexing elements;

the drive dog being additionally rotatable substantially about the axis, and having a first set of driving elements on an end thereof engageable with a second set of driving elements on the rotor, to enable rotation of the rotor by the drive dog relative to the support when the indexing elements are disengaged.

21. A probe head according to claim 20, wherein the biasing device comprises a magnetic element provided on one of the rotor and the support and a ferromagnetic element provided on the other of the rotor and the support, the motor increases and decreases the separation between the magnetic elements.

* * * * *